United States Patent

Funk

[11] Patent Number: 5,261,436
[45] Date of Patent: Nov. 16, 1993

[54] TENT

[76] Inventor: David H. Funk, 1091 W. Deerpath, Lake Forest, Ill. 60045

[21] Appl. No.: 914,079

[22] Filed: Feb. 16, 1992

Related U.S. Application Data

[63] Continuation of Ser. No. 727,181, Jul. 9, 1991, abandoned.

[51] Int. Cl.⁵ .............................................. E04H 15/42
[52] U.S. Cl. ........................................ 135/105; 135/119; 135/106; 135/909; 403/205; 403/305; 403/301
[58] Field of Search .............. 135/102, 105, 106, 114, 135/107, 108, 119, 909; 403/205, 305, 175, 287, 301

[56] References Cited

U.S. PATENT DOCUMENTS

| | | | |
|---|---|---|---|
| 1,129,194 | 2/1915 | Hanley | 135/107 |
| 1,678,350 | 7/1928 | Ott | 403/205 X |
| 1,770,852 | 7/1930 | Hill | 403/305 X |
| 1,821,182 | 9/1931 | Hoppes | 403/205 |
| 2,602,681 | 7/1952 | Bailey | 403/301 |
| 3,119,402 | 1/1964 | Bleick | 135/108 X |
| 3,181,542 | 5/1965 | Bareis | 135/105 X |
| 3,424,178 | 1/1969 | Yazaki | 135/909 X |
| 3,499,457 | 3/1970 | Waring et al. | 135/105 |
| 4,056,327 | 11/1977 | Daus, Jr. et al. | 135/909 X |
| 4,827,958 | 5/1989 | Cantwell et al. | 135/105 X |

FOREIGN PATENT DOCUMENTS

| | | | |
|---|---|---|---|
| 17301 | of 1895 | United Kingdom | 403/205 |
| 2024357 | 1/1980 | United Kingdom | 403/287 |

Primary Examiner—Carl D. Friedman
Assistant Examiner—Lan M. Mai
Attorney, Agent, or Firm—Lawrence I. Field

[57] ABSTRACT

A tent frame permits the roof and walls to be separately established, with consequent ease of erection.

1 Claim, 2 Drawing Sheets

TENT

This application is a continuation of application Ser. No. 07/727,181 filed Jul. 9, 1991, now abandoned.

This invention relates to tents and more particularly to the external frame by means of which the tent is supported.

The present state of the art is illustrated in U.S. Pat. No. 4,827,958 which issued on May 9, 1989, the disclosure of which is intended to be incorporated in the present application by this reference. The present invention is directed to an improvement in the support system for tents described in that patent.

In the prior art all tents, particularly umbrella tents such as those described in the above-identified patent, have attempted to simultaneously establish the roof and walls of the tent during erection of the unit. This usually makes it difficult to set up the tent and produces undesirable stressing of tent and frame members often resulting in torn or broken parts. Also, more than one person is required to properly erect the structure.

A principal object of this invention is to provide means for fixing or establishing the roof or dome of a tent prior to the erection of the side walls, whereby the setting up of the tent is accomplished in two separate and simplified steps. As a consequence a single individual can, with very little effort, erect any size tent normally used in backpacking or family camping.

This and other objects will become apparent or will be pointed out in the description which follows in which:

BRIEF DESCRIPTION OF THE INVENTION

Figure 1:
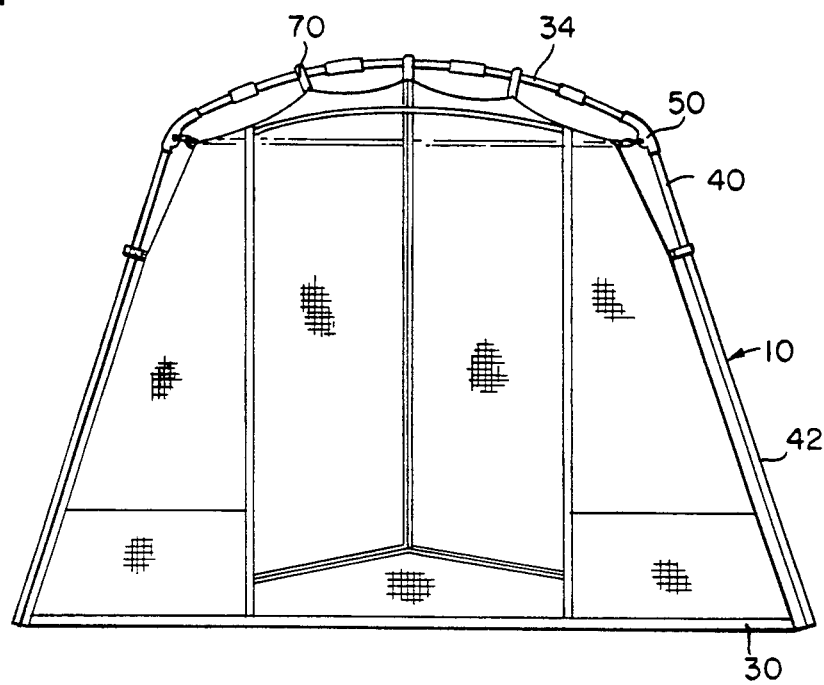
FIG. 1 is a front view of a tent of this invention.
Figure 2:
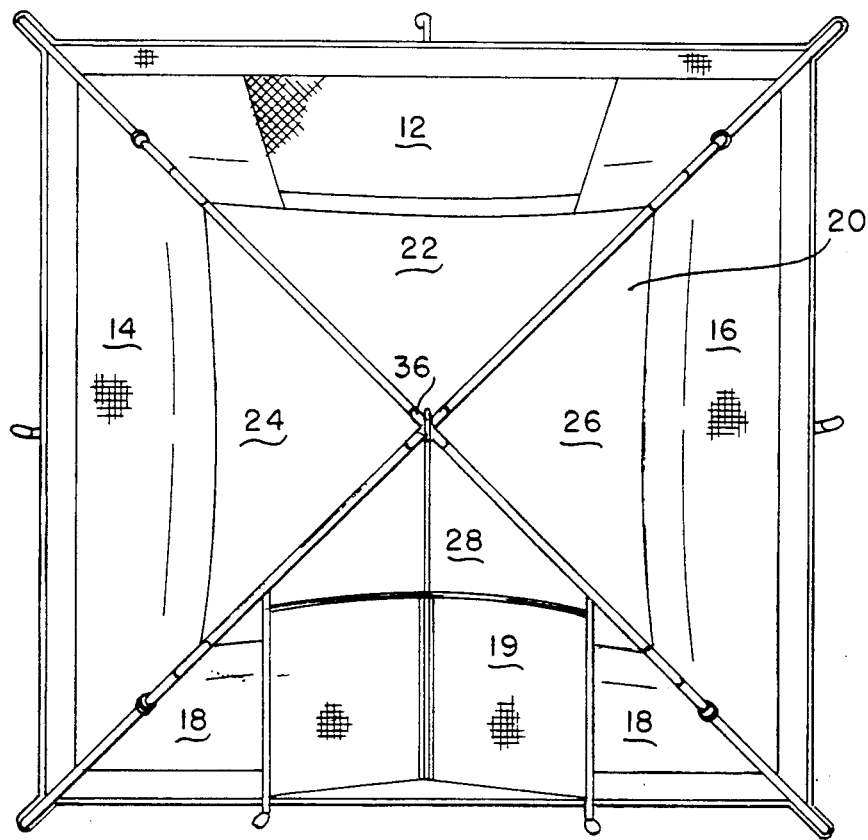
FIG. 2 is a top or plan view of the tent of FIG. 1.

Referring to FIGS. 1 and 2, an umbrella tent 10 such as that described in U.S. Pat. No. 4,827,958 is shown supported by an external frame 40. The tent shown has four walls, a rear wall 12, sidewalls 14 and 16 and a front wall 18 which may have a door opening 19. The tent also has a roof 20 comprised of rear panel 22, side panels 24 and 26 and a front panel 28. The invention is equally applicable to tents with more than four sides, and even to tents which are circular.

Figure 3:
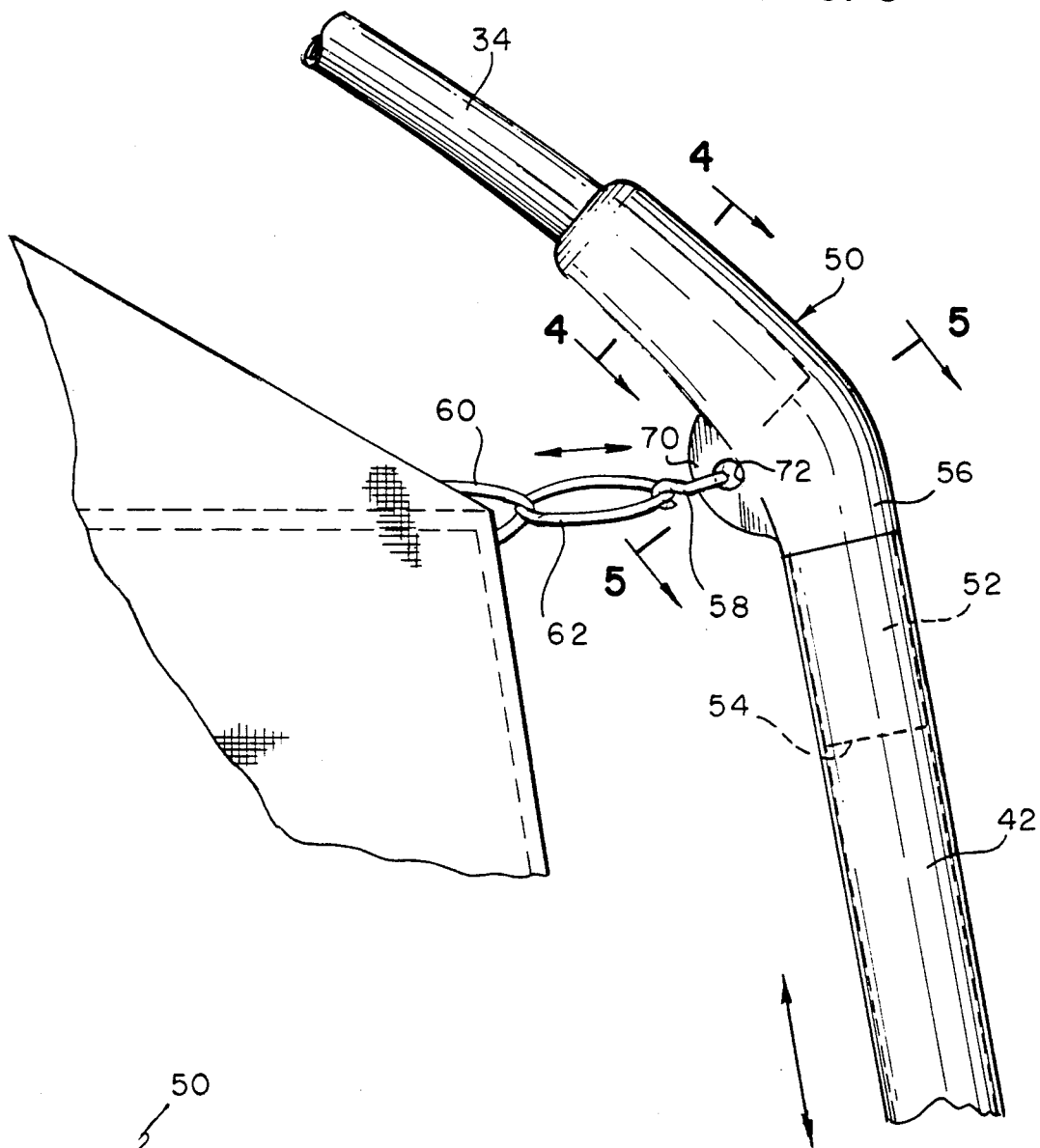
FIG. 3 is an enlarged view of connection between the roof frame member and the corner posts.
Figure 4:
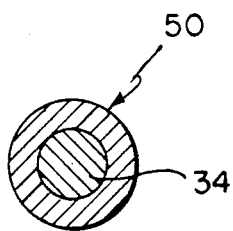
FIGS. 4 and 5 are sections on planes 4—4 and 5—5 of FIG. 3.
Figure 5:
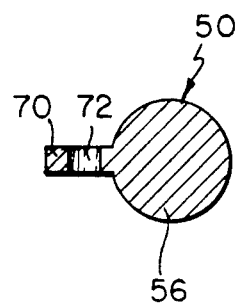

External frame 40 comprises straight tubular upright corner posts 42 extending upwardly from a tent floor 30 toward the tent roof 20. There is a tubular upright corner post 42 located at each corner of the floor. Spanning the roof extending from one corner to the opposite corner is a flexible roof frame member 34. There are two such frame members which intersect at 36 at the center of the roof. The free end of each roof span terminates adjacent to the upper end of a corner post 42 and is connected to the corner post by a fitting 50 shown in FIG. 3; In general the arrangement of the roof frame members, the floor and the corner posts is much the same as that shown in U.S. Pat. No. 4,827,958 except that the upper end portion of the upwardly extending corner posts is straight and is not curved as in the construction shown in U.S. Pat. No. 4,827,958. Instead the roof frame members 34 are connected to posts 42 by the elbow shaped fitting 50 shown in FIG. 3 which may be formed of metal such as aluminum alloy or stainless steel or which may be injection molded of a suitable resin or plastic. The lower end 52 of fitting 50 is a solid plug 54 which is dimensioned to fit into the upper end of a corner post 42. Extending upwardly from plug 54 is a tubular portion 56 which forms a socket wherein the lower end of each roof frame member 34 may be received in the upper end of its fitting 50. Roof member 34 may also be permanently attached to fitting 50. At roughly its midpoint, fitting 50 is provided with means to connect frame members to the roof fabric, namely an ear 70 having an eye 72 for engaging a hook 58 whereby fitting 50 may be joined to the tent by means of webbing loops 60 sewn to and extending from the tent. An elastic shock cord 62 connects hook 58 with loops 60.

The roof frame members 34 may be of aluminum, steel, or as is preferred they may be of fiberglass, or any other material that will hold the roof line after being attached to the post members at the corners. The roof members have limited flexibility. The roof may be attached to the tent with hooks, loops, pole sleeves or various combinations of fasteners shown generally in FIG. 1 as webbing loops 70.

To erect the tent, the roof frame members 34 are passed through the webbing loops 72 or similar fasteners. When all frame members have been attached to the tent roof at all eave corners, the tent is ready for erection.

After the roof is set, each upright can be dealt with individually to establish the corners of a regular or irregular polygon. Traditional tents have been square, rectangular, or hexagonal but, there are no limitations to the number of sides or corners or shape of the tents of this invention.

The end of each roof frame member 34 is inserted into the cup-shaped end of fitting 50 prior to erection of the tent. The roof frame member is permanently attached to fitting 50 by pressure fit, epoxy or other means. Then the plug end of each fitting is inserted into its corner post and is then connected to the tent by an elastic shock cord. This is done for each corner in succession thereby establish he tent in an upright configuration.

The construction described in U.S. Pat. No. 4,827,958 breaks the tent profile down into two segments. A curved roof and a straight wall. In order to achieve the curved roof line, the straight fiberglass poles must be retained in an arc, which requires a bending moment applied at the point of connection to the metal uprights. The difference between the present invention and U.S. Pat. No. 4,827,958 is that the roof line is achieved by attaching the roof frame members to the tent prior to installing the upright sections. In the patented tent the uprights are used in connection with the roof members to simultaneously establish the entire profile of the tent. In the present invention, the tension required to maintain the arc of the roof members is that derived from the fabric portion of the tent itself by connecting at the four corners. This absorbs all of the bending moment caused by the flexed fiberglass rods. The only stress remaining to be absorbed by the uprights is columnar.

By establishing the roof line first, then erecting the roof with the corner uprights, all stress on the uprights is columnar and there is no bending moment or torque required to maintain the integrity of the unit as in U.S. Pat. No. 4,827,958. Elimination of this bending moment during erection of the unit greatly simplifies the erection of the tent and reduces the stress on the frame members and thereby reduces the probability of bent or broken parts.

Attachment of the upright 42 to the tent at the base of the tent may be through a pin and ring assembly inserted into the bottom of the tubular corner post 42 as in U.S. Pat. No. 4,827,958 or merely set on the ground adjacent to the tent.

Having now described the invention in accordance with the patent statutes it is not intended that it be limited except as may be required by the appended claims.

I claim:

1. In a tent, a plurality of walls, a roof and an external frame system for holding the tent erect, the improvement which consists of providing as said frame system:

flexible resilient fiberglass reinforced resin roof frame members to be attached to said roof when bent in an arched configuration, a plurality of entirely straight tubular corner posts extending upwardly from a tent follow and supporting the walls of said tent, and fittings each connecting an upper end of each of said corner posts with a free end of each of said frame members, said fittings being configured so that when said tent is erected the stress on said corner posts is columnar, said fittings each consisting of an elbow shaped connector having a free lower end adapted to be detachably secured to an upper end of each of said tubular corner posts and an upper end connected to a free end of each of said roof frame members, the lower end of said fittings being plug-shaped for insertion into the upper end of one of said tubular corner posts after the roof of said tent is erected and the upper end of said fittings being cup-shaped to telescopically receive one end of said roof frame members and connection means approximately midway between the ends of said fitting for connecting said roof to said frame members so that the roof is erected first by hanging the roof on said frame members and then by attaching the roof fabric to said connection means consisting of an ear extending from said fitting approximately midway of the ends of said fitting, said ear having an eye for receiving a hook connecting said fitting to the fabric of one of said tent walls, whereby said frame members are bent into an arc shape holding the roof of the tent in tension and the independent erection of the roof of said tent and the remainder of said tent is facilitated.

* * * * *